W. KRIST.
ICE CREAM CONE FILLER.
APPLICATION FILED MAY 17, 1912.

1,057,065.

Patented Mar. 25, 1913.

Witnesses
J. J. Bremer.
H. C. Van Ryn.

Inventor
William Krist
By Evrill & Wheeler
Attorneys

UNITED STATES PATENT OFFICE.

WILLIAM KRIST, OF MILWAUKEE, WISCONSIN.

ICE-CREAM-CONE FILLER.

1,057,065.  Specification of Letters Patent.  Patented Mar. 25, 1913.

Application filed May 17, 1912.  Serial No. 697,874.

*To all whom it may concern:*

Be it known that I, WILLIAM KRIST, a citizen of the United States, residing at Milwaukee, county of Milwaukee, and State of Wisconsin, have invented new and useful Improvements in Ice-Cream-Cone Fillers, of which the following is a specification.

My invention relates to improvements in ice cream cone fillers.

One of the primary objects of my device is to provide an ice cream cone filler, the cream receptacle of which is adapted to be opened or separated as the frozen cream is deposited in the cone, whereby the respective sides of such receptacle are free to pass down the outside of the cone, while the cream is deposited in the mouth of the cone.

My invention is further explained by reference to the accompanying drawings, in which—

Figure 1:
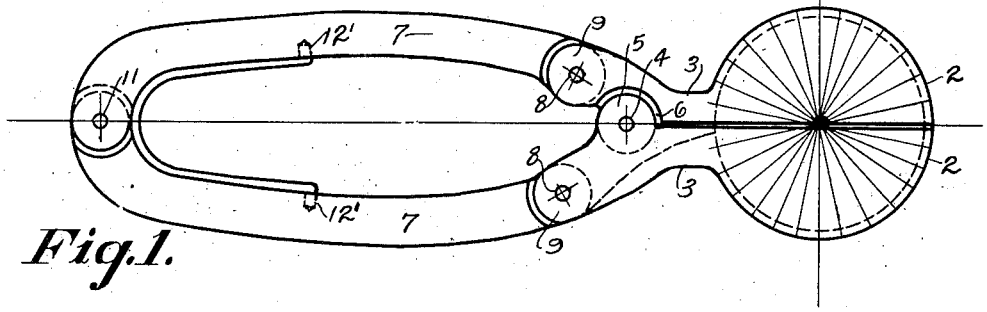
Figure 2:
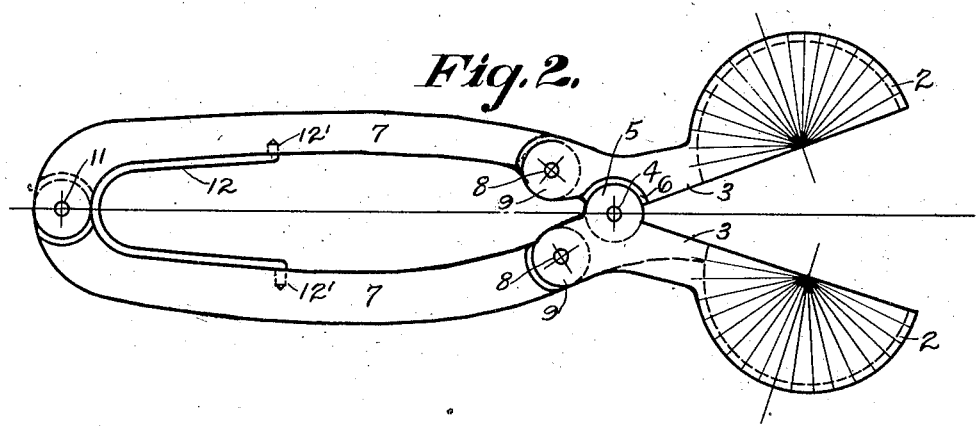
Figure 3:
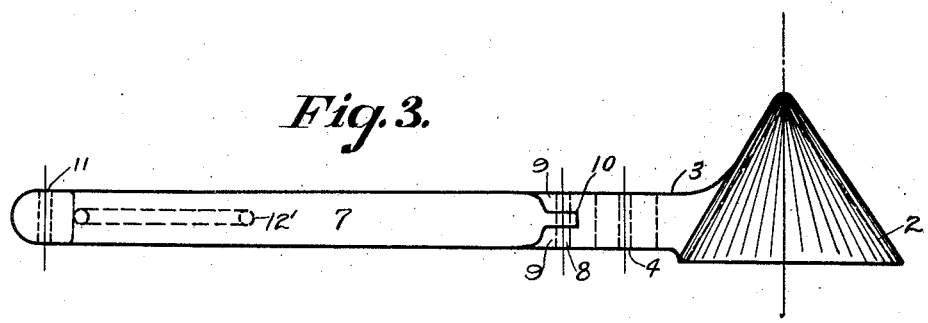

Figure 1 represents a top view of the cone filler in its closed position. Fig. 2 is a similar view, showing the receptacle in its open position, and Fig. 3 represents a side view of the device as the same appears when inverted preparatory to depositing the frozen cream in the mouth of the cone.

Like parts are identified by the same reference numerals throughout the several views.

The cream receptacle comprises the two side members 2, 2, which are pivotally connected together through the arms 3, 3, pivotal bolt 4 and lugs 5 and 6.

7, 7 are the operating handles which are respectively pivotally connected at one end with the arms 3, 3 through the pivotal bolts 8, 8 and lugs 9, 9 and 10, while the opposite ends of said handles are pivotally connected by the bolt 11.

12 is a U-shaped spring, the respective ends of which are connected with the opposing inner sides of the handles 7, 7, while the central portion of said spring extends rearwardly in close proximity to the contiguous ends of said handles, and the tension of such spring is such as to throw said handles apart or away from each other, whereby the respective sides 2 of the receptacle are normally retained in their closed position, as shown in Fig. 1.

The inner opposing sides of the handles 7 are respectively provided with transverse recesses or depressions 12, 12, shown in dotted lines in Figs. 1 and 2, for the reception of the ends of said spring, and the ends of said spring are retained in such recesses by its recoil.

It will now be understood that when desirous to separate the respective sides 2, 2 of the receptacle, the user of the filler has simply to force the respective members of the handles 7, 7 toward each other, whereby the sides of said receptable are thrown apart as shown in Fig. 2, when, as soon as the handles are released from the grip of the user, they are thrown apart by the recoil of said spring 12, whereby the respective sides 2, 2 of the receptacle are again brought together preparatory to filling the same with cream.

My device is used as follows:—The sides of the receptacle being together as shown in Fig. 1, the receptacle is forced into a body of cream until such receptacle is filled. When this is done, the receptacle is inverted over a cone and the respective handles 7, 7 are forced toward each other by the grip of the user as the receptacle is brought over and upon the outside of the cone, whereby the cream which has been thus dished up by the receptacle is deposited upon the mouth of the cone.

Having thus described my invention, what I claim as new, and desire to secure by Letters Patent, is—

In an ice cream cone filler, the combination of a cream receptacle comprising two separable members, an arm formed integrally with each of said members, means for pivotally connecting such arms together at an intermediate point between such receptacle and their ends, a pair of handles, means for pivotally connecting one end of each of said handles with the ends of said arms respectively, means for pivotally connecting the opposite ends of said handles with each other, and a spring connected with said handles adapted by its recoil to force such handles apart and normally retain the separable members of said receptacle together.

In testimony whereof I affix my signature in the presence of two witnesses.

WILLIAM KRIST.

Witnesses:
 JAS. B. ERWIN,
 I. D. BREMER.